Nov. 26, 1968   E. G. SPISAK   3,413,037
WHEEL COVER
Filed Nov. 17, 1966
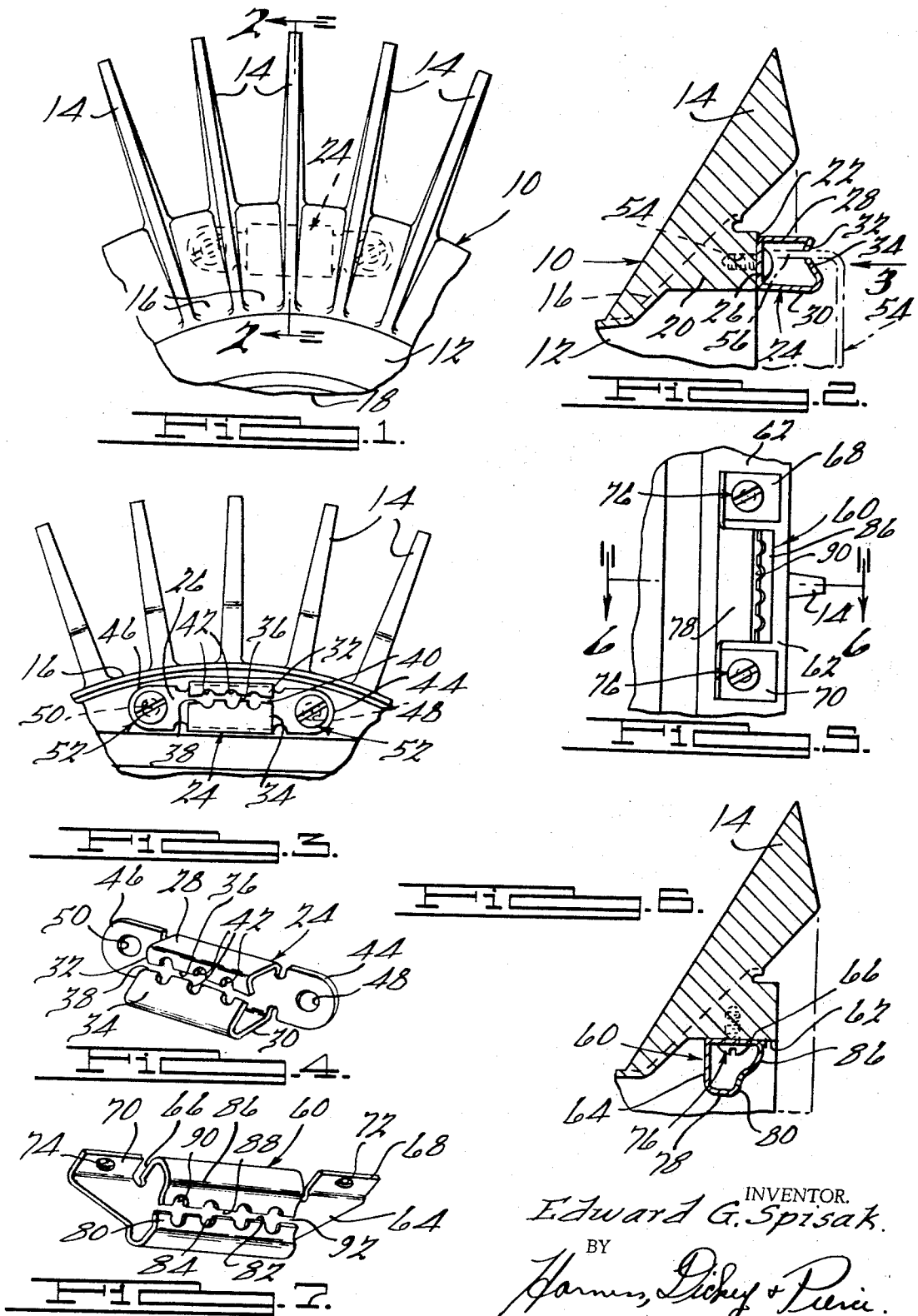
INVENTOR.
Edward G. Spisak
BY
Harness, Dickey & Pierce
ATTORNEYS.

United States Patent Office 3,413,037
Patented Nov. 26, 1968

3,413,037
WHEEL COVER
Edward G. Spisak, Wayne, Mich., assignor to Gar Wood Industries, Inc., Ypsilanti, Mich., a corporation of Michigan
Filed Nov. 17, 1966, Ser. No. 595,175
3 Claims. (Cl. 301—37)

ABSTRACT OF THE DISCLOSURE

In combination with a vehicle wheel and wheel cover therefor, the improvement comprising a plurality of circumferentially spaced one piece spring clip members interposed between the wheel and wheel cover members, each of the spring clip members comprising first and second axially and radially inclined retaining sections and a mounting section adapted to be fixedly secured to one of the members, the retaining sections defining an elongated arcuate shaped access opening therebetween and each defining biting edge portions, the biting edge portions each being formed with recessed areas defining anti-indexing sections thereon, and an axially extending retaining element interposed between the wheel and wheel cover members and adapted to be detachably received within the access openings of the spring clip members, whereby the biting edge portions thereof clampingly engage the radially inner and outer sides of the retaining element to positively secure the wheel cover member on the wheel member.

---

This invention relates generally to wheel covers and, more particularly, to a new and improved means for retaining wheel covers on vehicle wheels.

Decorative wheel covers must be positively engageable with their associated vehicle wheels to prevent inadvertent detachment thereof, yet such wheel covers must be readily removable from the wheels to provide access to the outer faces thereof, as for example, when it is necessary to change wheels on a vehicle. The prior art is crowded with various means for detachably securing wheel covers to vehicle wheels, such means usually being in the form of some type of resilient or spring clip fixedly secured to the axially inner face of the wheel covers and detachably engageable with the periphery or some other rim portion of the associated vehicle wheels; however, very few, if any, of such retaining means or clips have been capable of retaining more than one specific type of wheel cover on a vehicle wheel. Accordingly, it has been necessary for manufacturers of such means to continuously change the designs thereof in accordance with the specific construction and design of each of the various wheel covers produced.

A wheel cover in accordance with the principles of the present invention is adapted to be provided with a new and improved retaining means for securing the same on the axially outer face of a vehicle wheel. More particularly, such means is in the form of a new type of spring clip which is not only adapted to positively grip an associated vehicle wheel and may be easily applied and removed from such wheels, but which is also characterized by universality of installation due to the fact that it may be used on a wide variety of different wheel cover constructions and designs. The improved spring clip means of the present invention is further characterized by being of a relatively simple design and thus is economical to commercially manufacture.

It is accordingly a general object of the present invention to provide a new and improved spring clip means for retaining a wheel cover on a vehicle wheel.

It is another object of the present invention to provide a new and improved spring clip means of the above character which is adapted to be positive in its action to firmly secure a wheel cover on an associated wheel, yet may be easily applied and removed from such wheels.

It is still another object of the present invention to provide a new and improved spring clip means of the above character which may be operatively associated with either partial wheel covers or "hub caps" and "full" wheel covers of the conventional stamped metal construction, or with wheel covers constructed of a molded or cast material such as magnesium or aluminum.

It is a further object of the present invention to provide a new and improved spring clip means of the above character which is adapted to be secured to the associated wheel cover on either a radially or axially disposed portion thereof.

It is yet another object of the present invention to provide a new and improved spring clip means of a durable construction and which is easy to assemble on various types of wheel covers.

Other objects and advantages of the present invention will become apparent from the following detailed description, taken in conjunction with the accompanying drawing, wherein:

FIGURE 1 is a fragmentary side elevational view of a vehicle wheel cover showing an exemplary embodiment of the spring clip means of the present invention in operative association therewith:

FIGURE 2 is a fragmentary cross-sectional view of the wheel cover and spring clip means illustrated in FIGURE 1, as taken substantially along the line 2—2 thereof;

FIGURE 3 is a fragmentary side elevational view of the wheel cover and spring clip means shown in FIGURE 2, as taken in the direction of the arrow 3 thereof;

FIGURE 4 is an elevated perspective view of the spring clip means shown in FIGURES 1 through 3;

FIGURE 5 is a fragmentary bottom elevational view of a vehicle wheel cover having an alternate embodiment of the spring clip means of the present invention in operative association therewith;

FIGURE 6 is a fragmentary cross-sectional view of the wheel cover and spring clip means illustrated in FIGURE 5, as taken substantially along the line 6—6 thereof, and FIGURE 7 is an elevated perspective view of the spring clip means illustrated in FIGURES 5 and 6.

For convenience of description, the terms "axially inner," "axially outer" and words of similar import will have reference to the present invention hereinafter described in detail, with the axially outer side thereof being at the left side of FIGURE 1. Likewise, the terms "radially inner," "radially outer," and derivatives thereof will have reference to a geometric center of the present invention and the various portions thereof.

Referring now to the drawing, a decorative wheel cover 10 is shown as comprising a central hub section 12 having a plurality of equally circumferentially spaced radially outwardly extending ribs or projections 14 integrally formed thereon. It will be apparent that the wheel cover 10 may be of a variety of different designs and may, for example, be provided with a plurality of radially extending facets 16 and a centrally located medallion or "spinner" mounted at a central portion 18 of the hub section 12. It will also be apparent that the wheel cover 10 can be fabricated of a variety of different types of materials; however, the instant embodiment described herein shows the wheel cover 10 being molded or cast from aluminum or magnesium.

The hub section 12 of the cover member 10 is formed with a plurality of axially inwardly extending embossed sections 20, one of which is shown in FIGURE 2, that are preferably equally circumferentially spaced around the wheel cover 10. For example, the hub section 12 may be provided with four sections 20 which are spaced around the wheel cover 10 at 90° increments. Each of the sections 20 defines a radially extending face 22 upon which is mounted a spring clip member 24 that is constructed in accordance with the principles of the present invention. As best seen in FIGURES 3 and 4, the spring clip member 24 is of a one piece stamped construction that is preferably fabricated of a suitable spring steel or the like.

As best seen in FIGURE 2, the spring clip member 24 comprises a radially extending mounting section 26 which is adapted to abut against and be secured to the radial face 22 on the hub portion 20, as will later be described. The radially outer edge of the clip section 26 terminates at an axially inwardly extending side section 28, and the radially inner edge of the clip section 26 terminates at an axially inwardly extending side section 30. As illustrated, the sections 28 and 30 are generally parallel to one another. The axially inner edge of the clip section 28 is formed with a radially inwardly and axially outwardly inclined retaining section 32, and the axially inner edge of the clip section 30 is formed with a radially and axially outwardly inclined retaining section 34. As best seen in FIGURE 3, the retaining sections 32 and 34 define biting edge portions 36 and 38 which define an access opening 40 of a predetermined radial dimension. In a preferred construction of the present invention, the biting edge portions 36 and 38 are of a generally arcuate configuration with a result that the opening 40 is semicircular in shape about an axis extending substantially parallel to the axis of the associated wheel. Preferably the clip sections 32 and 34 are arranged at right angles with respect to one another, with the axially innermost sections of the biting edge portions 36, 38 lying along a common radial plane. The biting edge portions 36 and 38 are preferably formed with a plurality of substantially radially aligned semicircular recesses, generally designated 42, which function in a manner hereinafter to be described.

The mounting section 26 of the spring clip member 24 is formed with a pair of substantially circumferentially extending ear portions 44 and 46 that are disposed at the opposite ends of this clip member 24 and arranged substantially coplanar with the section 26 thereof. The ear portions 44, 46 are formed with openings 48, 50, respectively, which are adapted to receive suitable screws, bolts or the like, generally designated 52, that are adapted to be threadably received within suitable internally threaded bores 54 in the hub section 20 for fixedly securing the clip member 24 thereto.

In accordance with the principles of the present invention, the spring clip member 24 is adapted to be detachably secured to a fixed portion or member on the associated vehicle wheel and thereby secure the wheel cover 10 to the wheel. More particularly, the access opening 40 of the clip member 24 is adapted to receive an axially outwardly extending member on the vehicle wheel in a manner such that said member is clampingly engaged between the biting edge portions 36 and 38. As best seen in FIGURE 2, an exemplary construction of such a member to be engaged by the clip 24 is shown as comprising a radially extending plate 54 which is adapted to be fixedly secured to the axially outer side of the associated wheel, wheel hub or axle. By way of example, the plate 54 may be secured to the associated wheel by means of the wheel lugs used in securing the wheel to its associated wheel hub. The radially outermost portion of the plate 54 is formed with an axially outwardly extending retaining section 56 which may extend entirely around the outer periphery of the plate 54 at a radial position corresponding to the location of access openings 40 of each of the spring clip members 24 on the wheel cover 10. With this construction, the wheel cover 10 may be mounted on the associated wheel regardless of the relative rotational position of the wheel cover 10 with respect to the wheel. An alternate construction of the plate 54 is to provide a plurality of circumferentially spaced, axially outwardly extending retaining sections 56 around the periphery thereof, the number of sections 56 corresponding to and being circumferentially aligned with the spring clip members 24. This alternate construction is desirable from the standpoint that it requires less material and thus is more economical to commercially manufacture.

To effect mounting of the wheel cover 10 on its associated wheel, the cover 10 is radially and axially oriented with respect to the plate 54 in a manner such that the spring clip members 24 are arranged directly axially outwardly from the retaining section 56. The cover member 10 is thereafter biased axially inwardly, with the result that the retaining section 56 moves through the access openings 40 interjacent the biting edges 36 and 38 of the clip sections 32 and 34. By virtue of the fact that the axially innermost sections of the biting edge portions 36 and 38 are directly opposite one another, i.e., lie along the same radial plane, the edge portions 36, 38 will firmly clampingly engage the retaining section 56. The semicircular recesses 42 define a plurality of substantially pointed corner portions 58 at the juncture of the edge portions 36 and 38 therewith. The portions 58 are adapted to engage the retaining section 56 in a manner so as to positively prevent any indexing movement of the cover member 10 relative to the plate 54. Accordingly, the spring clip member 24 prevents the wheel cover 10 from moving either axially or circumferentially.

Referring now to FIGURES 5 through 7, a slightly modified embodiment of the present invention is shown as comprising spring clip member 60 that is preferably of a one-piece stamped metal construction, and is particularly adapted to be mounted on an axially extending surface 62 of the hub section 20, as opposed to radially extending face 22 thereof. The spring clip member 60 comprises a base or mounting section 64 which, as illustrated in FIGURE 6, terminates at its radially outer edge at an axially extending section 66. The opposite ends of the clip section 64 are formed with a pair of axially inwardly extending ear sections 68 and 70 which are disposed substantially coplanar with the section 66 and are formed with openings 72, 74, respectively, adapted to receive suitable mounting screws, bolts or the like 76.

The radially innermost portion of the clip section 64 is formed with an axially inwardly extending section 78 which is preferably arranged substantially parallel to the clip section 66. The axially innermost portion of the clip section 78 is formed with a radially and axially outwardly extending retaining section 80 that defines a biting edge portion 82 having a plurality of semi-circular recesses 84 formed therein. In a similar manner, the axially innermost portion of the clip section 66 is formed with a radially inwardly and axially outwardly extending retaining section 86 which defines a biting edge portion 88 having a plurality of semi-circular recesses 90 formed therein.

The spring clip member 60 is adapted to function in substantially the same manner as the spring clip member 24; that is, the biting edge portions 82 and 88 define an access opening 92 which is adapted to receive and clampingly engage a suitable axially extending member as, for example, the retaining section 56 of the member 54 shown in FIGURE 2, whereby to fixedly secure the associated wheel cover to a vehicle wheel.

While it will be apparent that the exemplary embodiments illustrated herein are well calculated to fulfill the objects above stated, it will be appreciated that the present invention is susceptible to modification, variation and change without departing from the proper scope or fair meaning of the subjoined claims.

What is claimed is:

1. In a wheel assembly comprising a vehicle wheel member and a wheel cover member adapted to be detachably secured to the axially outer side thereof, the improvement which comprises, a plurality of circumferentially spaced one piece spring clip members interposed between the wheel and wheel cover members, each of said spring clip members comprising first and second axially and radially inclined retaining sections and a mounting section adapted to be fixedly secured to one of said members, said retaining sections defining an elongated arcuate shaped access opening therebetween and each defining biting edge portions, said biting edge portions each being formed with recessed areas defining anti-indexing sections thereon, and an axially extending retaining element interposed between the wheel and wheel cover members and adapted to be detachably received within said access openings of said spring clip members, whereby said biting edge portions thereof clampingly engage the radially inner and outer sides of said retaining element to positively secure the wheel cover member on the wheel member.

2. The improvement as set forth in claim 1 wherein said retaining element is fixedly secured to said wheel member and wherein said mounting section of said spring clip members extends radially of said wheel member, and which includes means for fixedly securing said mounting sections of said spring clip members to a substantially radially extending surface portion of said wheel cover member.

3. The improvement as set forth in claim 1 wherein said retaining element is fixedly secured to said wheel member and wherein said mounting section of said spring clip members extends axially of said wheel member, and which includes means for fixedly securing said mounting section of said spring clip members to a substantially axially extending surface portion of said wheel cover member.

References Cited

UNITED STATES PATENTS

| | | | |
|---|---|---|---|
| 3,282,657 | 11/1966 | Bright | 24—259 X |
| 2,757,982 | 8/1956 | Lyon | 301—37 |
| 2,947,572 | 8/1960 | Lyon | 301—37 |
| 2,982,581 | 5/1961 | Lyon | 301—37 |
| 3,012,823 | 12/1961 | Spisak | 301—37 |
| 3,282,657 | 11/1966 | Bright | 24—259 X |

FOREIGN PATENTS 885,396   12/1961   Great Britain.

RICHARD J. JOHNSON, *Primary Examiner.*

UNITED STATES PATENT OFFICE
CERTIFICATE OF CORRECTION

Patent No. 3,413,037                                        November 26, 1968

Edward G. Spisak

It is certified that error appears in the above identified patent and that said Letters Patent are hereby corrected as shown below:

Column 6, line 15,
        3,282,657   11/1966   Bright -------- 24-259 X
                          should read
        2,231,183   2/1941    Flandes ------- 301-37 X Signed and sealed this 10th day of March 1970.

(SEAL)
Attest:

Edward M. Fletcher, Jr.                                WILLIAM E. SCHUYLER, JR.
Attesting Officer                                                  Commissioner of Patents